C. H. DOUGLAS.
SAW SHARPENER.
APPLICATION FILED SEPT. 27, 1915.
1,208,521.
Patented Dec. 12, 1916.
2 SHEETS—SHEET 1.
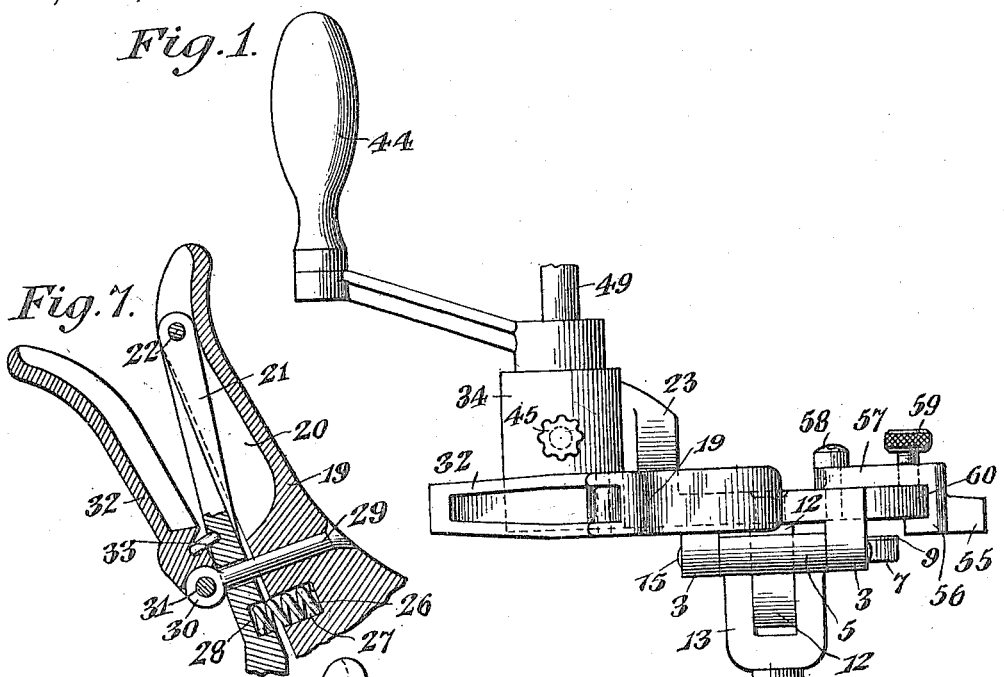
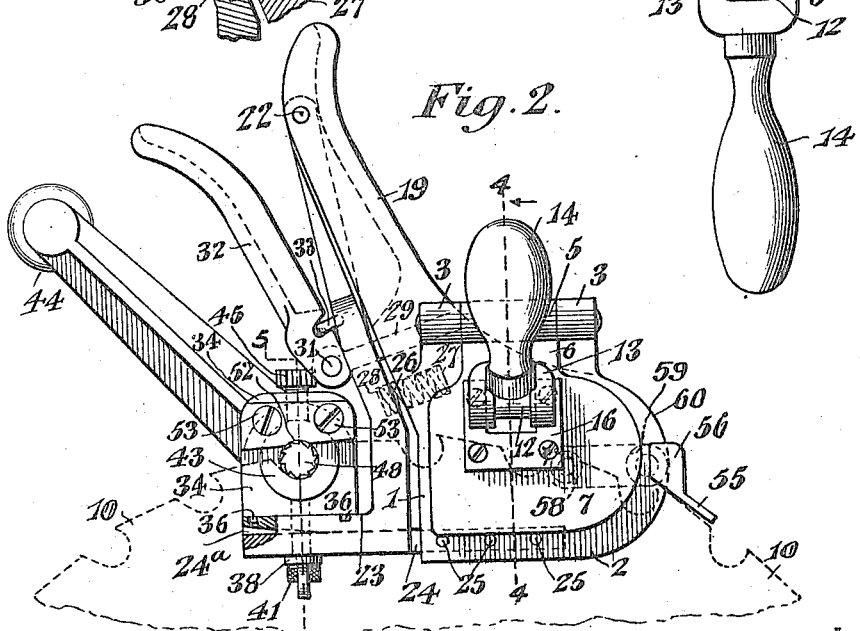
WITNESSES:
Jas. H. McCathran
F. T. Chapman.
Charles H. Douglas, INVENTOR
BY E. G. Siggers
Attorney

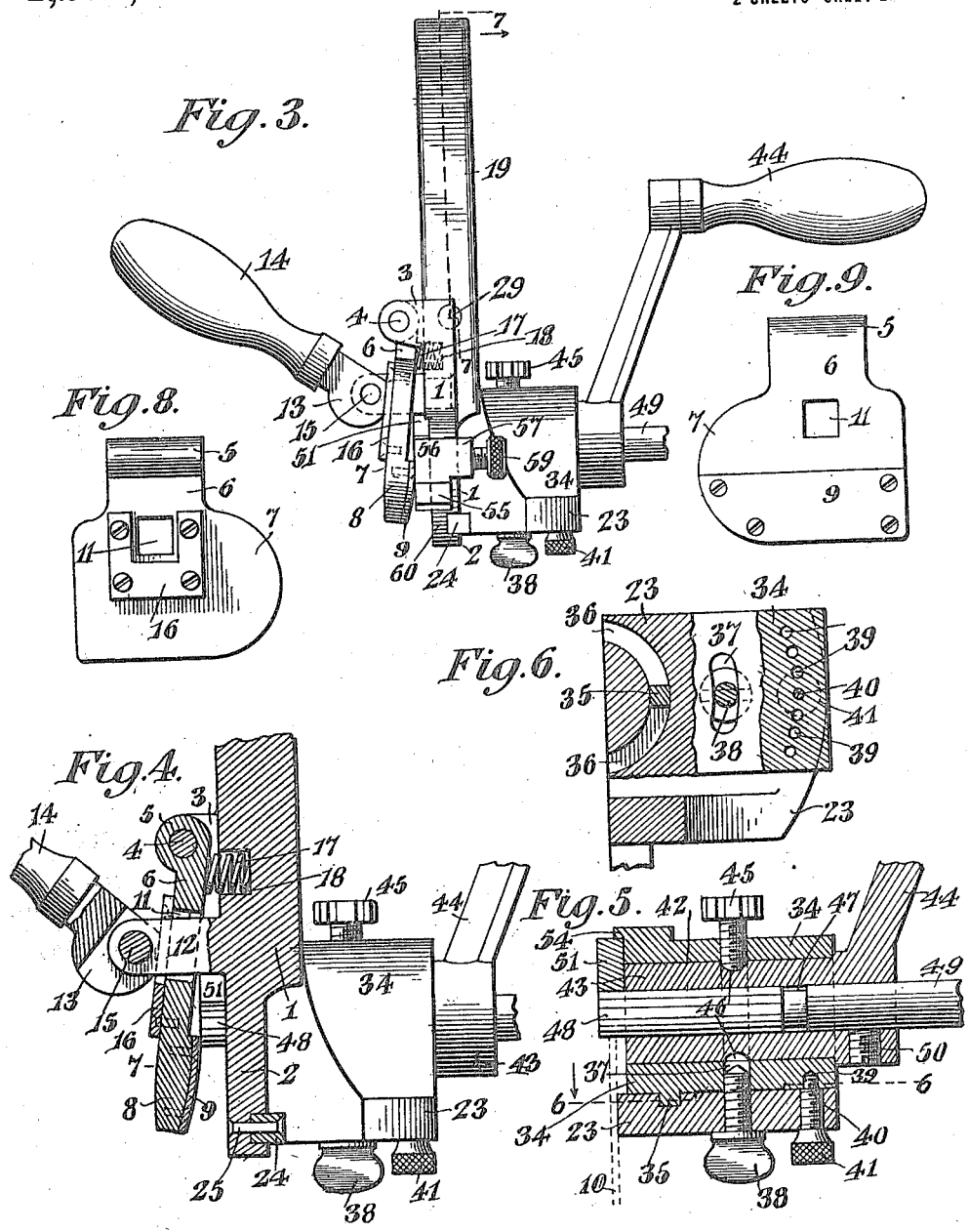

UNITED STATES PATENT OFFICE.

CHARLES H. DOUGLAS, OF SPRINGFIELD, MASSACHUSETTS, ASSIGNOR TO DOUGLAS SAW & MACHINERY COMPANY, OF BOSTON, MASSACHUSETTS, A CORPORATION OF MASSACHUSETTS.

SAW-SHARPENER.

1,208,521.   Specification of Letters Patent.   Patented Dec. 12, 1916.

Application filed September 27, 1915. Serial No. 52,943.

*To all whom it may concern:*

Be it known that I, CHARLES H. DOUGLAS, a citizen of the United States, residing at Springfield, in the county of Hampden and State of Massachusetts, have invented a new and useful Saw-Sharpener, of which the following is a specification.

This invention has reference to saw sharpeners and is especially designed to operate upon circular saws that have teeth producing a chisel cut.

The invention is an improvement upon the saw sharpeners for which Letters Patent No. 555,567, and No. 603,007 were granted to me on March 3, 1896, and April 26, 1898, respectively.

In the saw sharpeners of the type indicated in the two Letters Patent referred to, a clamping means for gripping the saw is provided, and carried by the clamping means is a hand-operated grip acting upon a milling cutter arranged to be rotated by hand with the grip so constructed as to draw the milling cutter into the throat of the tooth being sharpened, whereby the cutting edge of the tooth is burnished against a hardened backing plate, thereby producing a sharp cutting edge with hardly an appreciable loss of metal. Difficulty has been found with the saw sharpeners disclosed in the two patents in that sufficient force could be exerted upon the hand grip to slide the clamping means upon the saw blade before the desired pressure is brought to bear upon the milling tool and corresponding difficulty has been encountered in producing the desired effect in sharpening the saw teeth. By the present invention the clamping surfaces are so arranged and extended that without injury to the saw blade the sharpener is clamped so firmly thereto that no amount of force exerted by the hand of the user upon the hand grip is sufficient to cause any slippage whatever of the sharpener and saw with relation to each other. Because of this the operator is enabled to quickly produce the desired cutting edge upon the teeth with certainty, and also expeditiously, whereby a circular saw of considerable size, say, sixteen or more inches in diameter, may be resharpened and put into perfect condition in but a very few minutes and with so little removal of metal from the throats of the teeth that a saw may be resharpened many times before there is any material wear.

For this reason the use of the sharpener of the present invention is productive of an extended life for the saw, while at the same time the saw is maintained in the best possible condition for use.

The invention will be best understood from a consideration of the following detailed description, taken in connection with the accompanying drawings forming part of this specification, with the further understanding that while the drawings show a practical form of the invention, the latter is not confined to any strict conformity with the showing of the drawings, but may be changed and modified, so long as such changes and modifications come within the scope of the appended claims.

In the drawings:—Figure 1 is a plan view of the sharpener. Fig. 2 is a side elevation of the sharpener showing in dotted lines a saw to which the sharpener is applied. Fig. 3 is an end elevation of the structure of Fig. 1, as viewed from the right hand end, with the handle of the milling tool in somewhat different position from that shown in Fig. 1. Fig. 4 is a section on the line 4—4 of Fig. 2, but omitting any indication of the saw. Fig. 5 is a section on the line 5—5 of Fig. 2 with a portion of the saw shown in dotted lines. Fig. 6 is a section on the line 6—6 of Fig. 5. Fig. 7 is a detail section on the line 7—7 of Fig. 3, the section being restricted to the manipulating members for feeding the milling tool. Fig. 8 is a detail elevation of the movable clamping jaw as viewed in Fig. 2. Fig. 9 is an elevation of the same jaw but viewed from the opposite side.

Referring to the drawings there is shown a frame 1 having an extended surface 2 designed to form one face or jaw of the saw clamp to be referred to hereinafter. The frame 1 is provided with spaced ears 3 traversed by a pintle 4 carrying a hinge barrel 5 connected by a neck 6 to one side of a plate 7 constituting the other jaw of the saw clamp connected to the main frame or body of the sharpener by the hinge connection made up of the lugs 3, pintle 4 and barrel 5. That part of the plate 7 remote from the barrel 5 is thickened, as indicated at 8, and is there provided with a facing 9 of suitable material designed to engage one face of a circular saw 10 shown in dotted lines in Figs. 2 and 5, but omitted from the other figures. The plate 7 near that edge from which the neck 6 projects has a through passage 11 traversed by a post 12 projecting from the body 1. The post 12 at the end remote from the main frame or body 1 is straddled by a bifurcated cam member 13 to which is attached a manipulating handle 14. The cam member 13 is eccentrically traversed by a pivot pin 15 carried by the post 12. That face of the plate or jaw 7 remote from the facing 9 is provided with a bearing plate 16 cut out about the opening 11 and so positioned as to receive the thrust of the active edges of the bifurcated cam 13. A spring 17 has one end lodged in a recess 18 in the body member 1 and this recess is so positioned with relation to the jaw 7 that it bears against the neck 6 adjacent to the barrel 5 and tends constantly to move the bearing portion 9 of the jaw away from the bearing face 2 of the body member 1, thereby maintaining the bearing plate 16 in engagement with the cam 13 even when the latter is moved to a position to permit the jaw 7 to open away from the bearing face 2. The parts are so proportioned that when the cam handle 11 is moved in the direction to cause the cam to act on the clamp jaw 7 to move it toward the bearing face or jaw 2 to grip a saw blade, the latter will be gripped with requisite force when the handle 14 is close to parallelism with the jaw 7. Then forces tending to move the jaw 7 away from the jaw 2 are ineffective, since the parts are practically in line with the pivot 15 and bearing points on the cam. In this way the cam clamping device becomes automatically locked in the clamping position. Because of the broad clamping surfaces provided by the surface 2 and the facing 9, the sharpener is so firmly clamped to the saw that no force exerted in the operation of the sharpener can move the sharpener along the saw or the saw through the sharpener.

Formed on the body member 1 is a handle or gripping member 19 somewhat inclined with relation to the body portion of the sharpener. The inclination is with reference to the usual position of the body member in the sharpening operation. Customarily the sharpener is applied to the saw when the latter is mounted on a substantially horizontal axis, so that the blade is upright and the sharpener is secured to the top portion of the blade. In this position, indicated in Fig. 2, the operator stands at the right hand side as viewed in Fig. 2, wherefore the gripping member 19 slants away from the operator. This gripping member is conveniently made in one piece with the body member, although, of course, it may be made separate therefrom and secured thereto in any appropriate manner. The member 19 is conveniently shaped for grasping by the human hand, and on the side remote from the operator is formed with a longitudinal channel 20 into which enters one end of an arm 21 connected at the extremity of said end to the handle member 19 within the channel 20 by a pivot pin 22 traversing the channel 20. That end of the arm 21 remote from the pivot 22 is expanded into a ledge 23 underridden by a guide bar 24 made fast to the body member 1 by rivets 25 or otherwise. The arm 21 with the ledge 23 is constantly urged away from the body member by a spring 26, one end of which is lodged in a recess 27 in the manipulating member 19 and the other end in a recess 28 in the arm 21.

Fast in the member 19 and traversing the arm 21 is a pin 29 terminating in an eye 30 on that side of the arm 21 remote from the member 19. Pivoted to the eye 30 by a pivot pin 31 is a lever 32 between which and the arm 21 is a loose pin 33 by means of which motion is transmitted from the lever 32 to the arm 21. The lever 32 and member 19 are shaped and related to be readily grasped by the human hand in a manner to cause the approach of the lever 32 toward the member 19 which approach acts through the pin 33 to rock the arm 21 about the pivot 22 toward the member 19, thus compressing the spring 27 and causing the ledge 23 to move along the supporting bar 24. Such movement, however, is relatively slight and need not exceed a very small fractional portion of an inch. The purpose of this movement will appear hereinafter.

Mounted on the ledge 23 is a block 34 provided on the face engaging the ledge 23 with a lug projection 35 engaging in a curved recess 36 in that face of the ledge 23 engaged by the block 34. The recess or groove 36 is curved about a center outside of the ledge 23, but close to that face of the saw remote from the ledge 23 when a saw is clamped by the sharpening device. The ledge 23 has a slot 37 formed therethrough, this slot curving in conformity with the curvature of the recess 36. The slot 37 is traversed by the stem of a thumb screw 38 threaded into the block 34, so that the block 34 may be moved on the ledge into different angular relations thereto through an arc coinciding with the curvature of the recess 36 and tightly clamped in any one of the adjusted positions by the thumb screw 38. To determine the different angular positions of the block 34, as well as a central or neutral position, the block is provided with a curved series of sockets 39 into which a pin extension 40 of a thumb screw 41 may enter. The thumb screw 41 is threaded through the ledge 23 in proper position for the purpose.

The block 34 has a bore 42 through it and journaled in this bore is a hub 43 with a handle 44 at one end, such end being the one remote from the saw end of the block 34. The hub 43 is held in the block 34 by a set screw 45 which may be in the form of a thumb screw threaded through the block 34 and entering a circumferential groove 46 in the hub 43, whereby the hub may be freely turned but cannot move lengthwise in the bore except when the thumb screw 45 is purposely removed from its seated position in the groove 46. The hub 43 has an axial passage 47 completely therethrough, and said passage is adapted to be traversed by an elongated milling tool 48 having an extended shank 49 fixed in any desired position by a set screw 50 threaded through the hub 43. Fast to that end of the block 34 remote from the handle 44 is a hardened steel plate 51 having in one edge a recess 52 conforming in curvature to the periphery of the milling tool 48, whereby the milling tool may turn in substantial contact with the wall of the recess 52 without bearing thereupon with any force tending to cause the milling tool to act upon the plate or be acted upon thereby. The plate 51 may be held to the block by screws 53 assisted by an overhang flange 54 formed on the corresponding end of the block 34. That portion of the plate 51 toward the saw clamping portion of the sharpener serves as a limiting stop for the movement of the sharpener upon the saw toward the center of the latter.

At that end of the body portion 1 remote from the milling tool there is provided a stop member in the form of a plate or lug 55 formed on one end of a recessed block 56 fitting about the corresponding end of the body member 1. The block 56 is provided with an extension 57 connected by a screw 58 to the body member, while a set screw 59 threaded through the block 56 bears against the body member 1 and thereby clamps the block 56 in any one of different adjusted positions. The corresponding edge of the body member 1 embraced by the block 56 is curved, as shown at 60, on an arc of which the screw 58 is the center. This insures the firm positioning of the block 56 with the stop member 55 against accidental displacement.

Assuming that the stop member 55 has been properly located and also that the clamp jaw 7 is in the open position, the sharpener is placed upon the saw 10 with the projecting end of the milling tool 48, which end underrides the plate 51, lodged in the throat of a saw tooth. Furthermore, the block 34 is assumed to be adjusted about its center of movement into such angular relation to the plane of the saw blade as may be necessary for the character of the teeth to be treated. In the drawings the milling tool has its longitudinal axis at right angles or perpendicular to the plane of the saw, but for some saws it is necessary that it be at some other angle. Since the angles of the teeth are definitely fixed and the sockets 39 agree thereto, the block 34 may be properly adjusted with the assurance that the angle of adjustment is correct. Under the circumstances assumed the arm 21 with the ledge 23 is at its greatest distance from the body member being maintained in such position by the spring 26. Now the handle 14 of the cam 13 is moved in a direction to bring the clamp surface 9 in engagement with one face of the saw, forcing the other face of the saw into firm unyielding engagement with the surface 2 of the body member. These surfaces being large, frictionally engage the saw blade with a force which is wholly unyielding to any force applied to the sharpener during the operation of sharpening. The operator now grasps the gripping members 19 and 32 and drawing them together by the force exerted by one hand applies turning force to the crank 44, thereby rotating the milling tool in the proper direction. This causes the action of the milling tool upon the throat of the tooth being treated with the edge of the tooth bearing against the plate 51 at the point where the milling tool enters the recess 52. The force exerted by the milling tool upon the tooth corresponds to the grip applied to the gripping members 19 and 32 and a very few turns of the milling tool are sufficient to burnish the cutting edge of the saw tooth against the plate 51 at the entering edge of the recess 52.

In practice it is found that three or four or a very few more turns of the milling tool are sufficient to produce a keen cutting edge upon the saw tooth. The action is more of a burnishing action than a cutting action and an almost inappreciable amount of metal is removed from the throat of the saw tooth, the effect being similar in appearance to burnishing. Such burnishing occurs between two hardened steel surfaces, one of which, the milling tool, being capable of removing a very slight amount of metal from the saw blade. The pressure of the milling tool in the throat of the saw may be nicely regulated by the hand of the operator and the pressure may be regulated with certainty, since there is no danger whatever of the sharpener slipping on the saw or the saw slipping in the sharpener to make the applied pressure uncertain. Each tooth usually requires but a few turns of the milling tool and as the sharpener is quickly released and readjusted to the next tooth in order a saw can be sharpened with great facility, it taking but a few moments, say, six or eight minutes, to sharpen a sixteen inch circular saw.

In the saw sharpener of the present invention not only are the clamp surfaces broad, and therefore, productive of firm engagement with the saw, but the movable surface of the clamp approaches and recedes from the face of the saw blade in approximately perpendicular relation thereto without turning or other movements liable to produce rubbing, wherefore the saw blade is in no wise marred by the application of the clamp. The actuating means for moving the milling tool against the saw blade is a compound lever and consequently the amount of force which must be exerted by the hand of the user is small.

The guide bar 24 enters a channel 24$^a$ in the ledge 23, which channel is curved in a manner permitting the swinging of the ledge and the tool carrying block 34 about an arc of long radius struck from the pivot 22, which pivot is in the installed position of the machine substantially over the milling tool, so that the path of the milling tool toward the wall of the tooth being sharpened is such that the milling tool moves into engagement with the pivot of the saw tooth, burring or burnishing it against the plate 51 without the production of a feather edge, because the edge of the plate 51 where merging into the recess 52 provides a solid backing for the tooth being sharpened and for the milling tool acting on the tooth.

What is claimed is:—

1. A saw sharpener provided with a tool for acting on the teeth of the saw, a carrying structure for the tool, a clamp on the carrying structure comprising a fixed and a movable jaw for engaging respectively opposite faces of the saw, and means for actuating the movable jaw, the clamp jaws having laterally extended bearing surfaces each of an area to so frictionally grip the respective faces of the saw without injury thereto as to effectively prevent slipping of the saw sharpener on the saw under conditions of use, and said carrying structure also having means under the control of an operator for moving the sharpening tool against the teeth being sharpened.

2. A saw sharpener comprising a body member with a clamping jaw hinged thereto, a locking cam for moving the hinged jaw to clamp a saw blade against the body member, a rockable tool carrier provided with means for receiving and rotating a sharpening tool, and means under the control of the hand of an operator for moving the tool against a saw tooth for sharpening the latter.

3. A saw sharpener comprising a body member with clamping means thereon for fastening the body member to a saw blade and also having a handle member projecting therefrom, a rockable tool carrier mounted on the body member and having its axis of rocking located in the handle member at the end thereof remote from the portion of the body member from which the handle member extends, and manipulating means for rocking the tool carrier associated and coacting with the handle member.

4. A saw sharpener comprising a body member with clamping means thereon for fastening the body member to a saw blade, a rockable tool carrier mounted on the body member, and manipulating means for rocking the tool carrier, the tool carrier having its axis of rocking located in the manipulating means at the end thereof remote from the tool, said manipulating means including a lever in position to be grasped by the hand, a fixed member in operative relation to the lever and adapted to be grasped by the same hand as the lever, and said lever and rockable member being related to constitute a compound lever.

5. A saw sharpener comprising a body member with clamping means thereon for securing the body member to a saw blade and said body member being provided with a hand hold projecting therefrom in a direction away from the saw to which the body member is clamped, a rockable member pivoted to the hand hold near the end thereof remote from the body member, means for the actuation of a sharpening tool carried by the rockable member, and a lever connected to and associated with the hand hole and engaging the rockable member in compound lever relation thereto.

6. A saw sharpener comprising a body member with means for clamping it to the saw blade to be sharpened, said body member being provided with a hand hold projecting therefrom in a direction away from the saw to be sharpened, a rockable member provided with an arm pivoted to the hand hold near the end thereof remote from the body member and also having a tool carrier in operative position to the saw to be sharpened when the sharpener is applied thereto, and a lever associated with the hand hold and pivoted thereto on the side of the arm remote from the hand hold and provided with means for engaging the arm, whereby the lever and arm constitute a compound lever for moving a sharpening tool mounted in the carrier in engagement with the tooth of the saw being sharpened.

7. A saw sharpener comprising a body member with means for carrying a saw sharpening tool, and a clamp for securing the body member to a saw blade, comprising a laterally extended plate hinged to the body member in position to engage one face of a saw blade and force the other face against the body member, a clamping cam carried by the body member on the side of the plate remote therefrom, and bearing means on the plate in the path of the cam.

8. A saw sharpener comprising a body member with means for carrying a saw sharpening tool, and a clamp for securing the body member to a saw blade, comprising a laterally extended plate hinged to the body member in position to engage one face of a saw blade and force the other face against the body member, a clamping cam carried by the body member on the side of the plate remote therefrom, and bearing means on the plate in the path of the cam, said plate being provided with a facing on the side toward the body member to bear against the corresponding face of the saw blade when in the clamped position.

9. A saw sharpener comprising a body member with a clamping means thereon and a hand hold projecting therefrom, a guide bar carried by the body member, a rockable member provided with an arm pivoted to the hand hold at the end thereof remote from the clamping portion of the body member, said rockable member having guiding means coacting with the bar, elastic means for holding the rockable member away from the body member, a lever pivoted to the hand hold on the side of the arm remote from the said hand hold and in coactive relation to the hand hold, whereby both the hand hold and lever may be grasped by the hand, and the lever and arm constituting a compound lever, and a rotatable tool holder mounted on the rockable member for movement thereby.

10. A saw sharpener comprising a body member provided with a clamp for fastening it to the saw, said clamp having a broad faced jaw with means for engaging the jaw to move it into clamping relation to a saw blade, and said body member having a hand hold projecting therefrom in a direction away from a saw clamped to the body member, a carrier with a supporting arm pivoted to the hand hold at a point remote from the body member, a lever pivoted to the hand hold on the side of the arm remote from the hand hold, said lever and arm coacting to constitute a compound lever in operative relation to the hand hold, and a tool holder on a part of the carrier remote from the pivot of the arm and provided with means for carrying and rotating a tool in position to engage in the throat of the tooth of a saw to which the sharpener is clamped, said tool holder being mounted on the carrier for movement about an axis perpendicular to the axis of rotation of the tool carrying and rotating means.

11. A saw sharpener provided with means for clamping it to a saw, and means for carrying a sharpening tool in operative relation to the tooth of a saw to which the sharpener is clamped, and a gage for adapting the sharpener to saws of different sizes, said gage comprising a block with a lug adapted to engage the peripheral portion of the saw, said block having a pivot connection to the saw sharpener and also provided with a clamp screw for holding the block in different adjusted positions about its pivot connection.

In testimony, that I claim the foregoing as my own, I have hereto affixed my signature in the presence of two witnesses.

CHARLES H. DOUGLAS.

Witnesses:
JOHN H. SIGGERS,
JOHN R. RAY.

Copies of this patent may be obtained for five cents each, by addressing the "Commissioner of Patents, Washington, D. C."